Feb. 20, 1968    D. A. KOHL    3,369,445
OPTICAL ALIGNMENT ASCERTAINING DEVICE AND PROCESS
FOR ELIMINATION OF REFRACTIVE EFFECTS
Filed Sept. 9, 1963    3 Sheets-Sheet 1
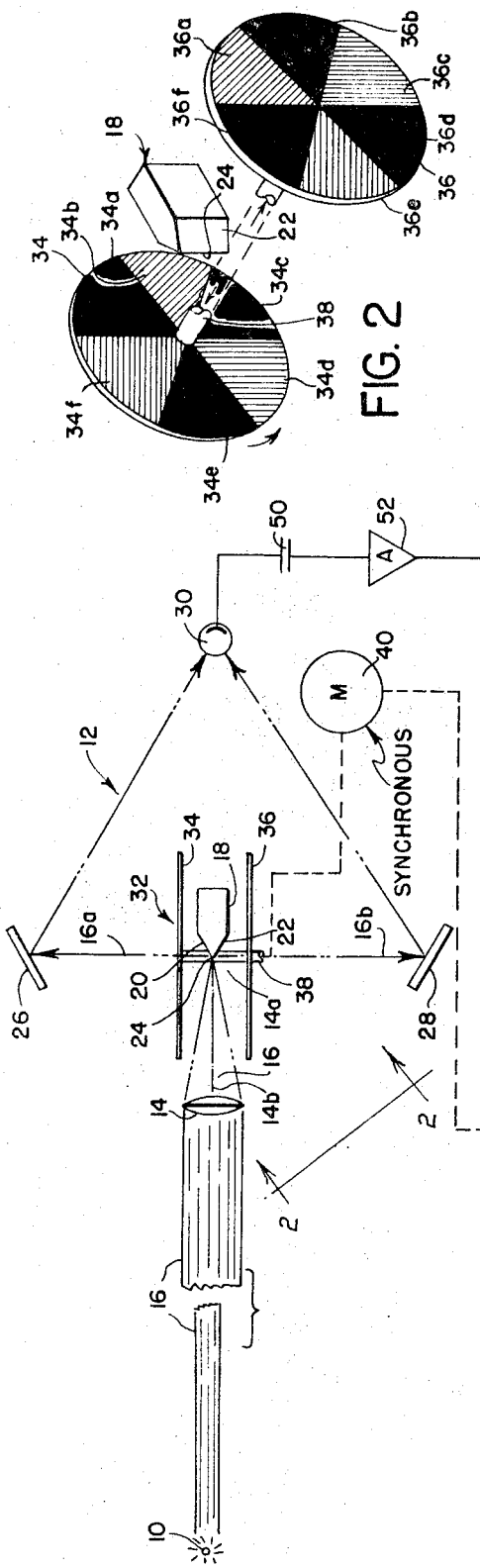
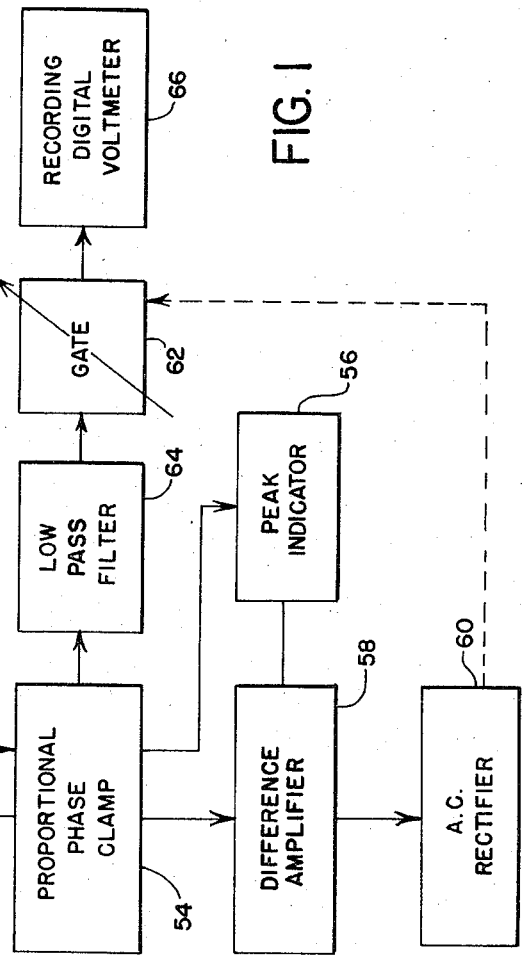
INVENTOR.
DOUGLAS A. KOHL
BY Robert B. Hughes
ATTORNEY Feb. 20, 1968     D. A. KOHL     3,369,445
OPTICAL ALIGNMENT ASCERTAINING DEVICE AND PROCESS
FOR ELIMINATION OF REFRACTIVE EFFECTS
Filed Sept. 9, 1963     3 Sheets-Sheet 2
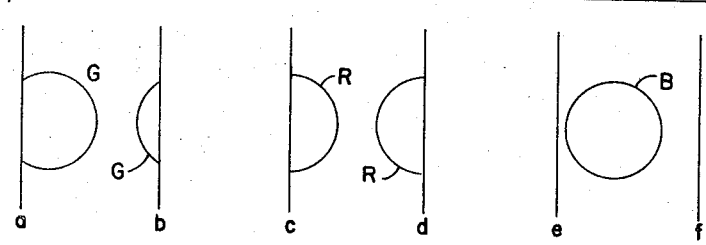
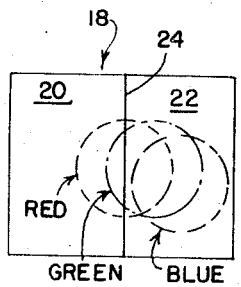
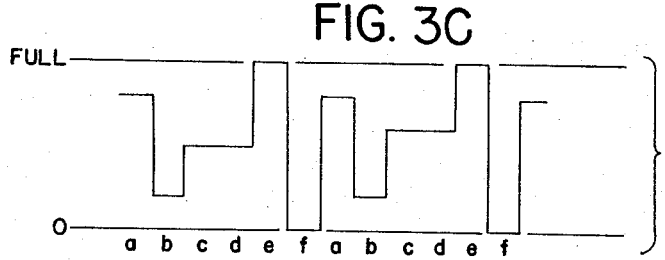
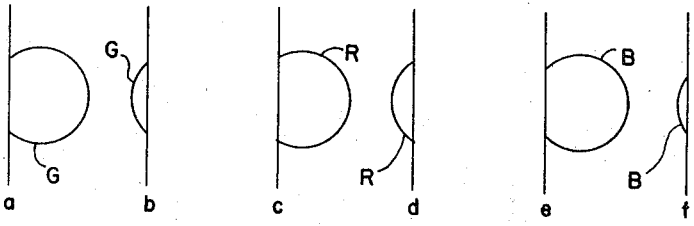
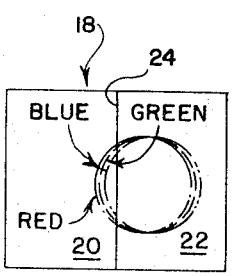
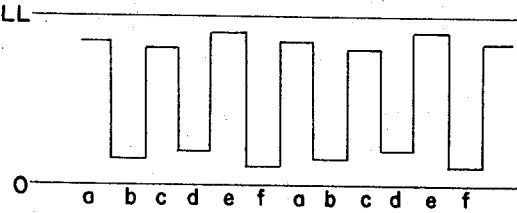
INVENTOR.
DOUGLAS A. KOHL
BY Robert B Hughes
ATTORNEY Feb. 20, 1968  D. A. KOHL  3,369,445
OPTICAL ALIGNMENT ASCERTAINING DEVICE AND PROCESS
FOR ELIMINATION OF REFRACTIVE EFFECTS
Filed Sept. 9, 1963  3 Sheets-Sheet 3
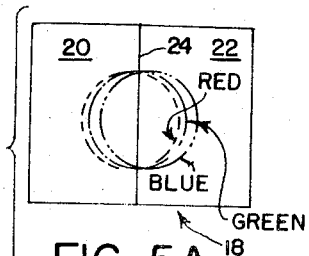
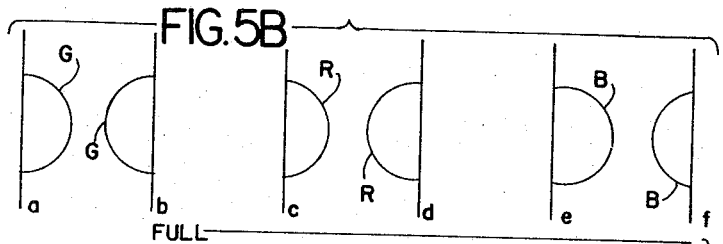
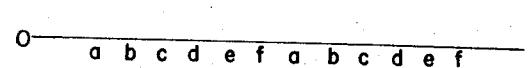
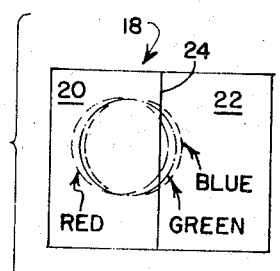
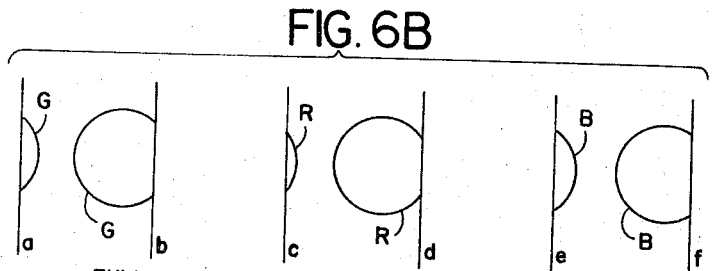
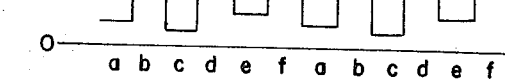
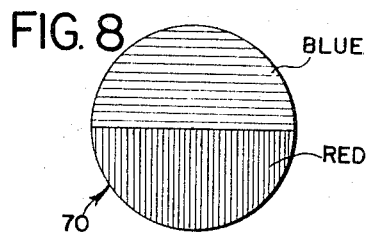
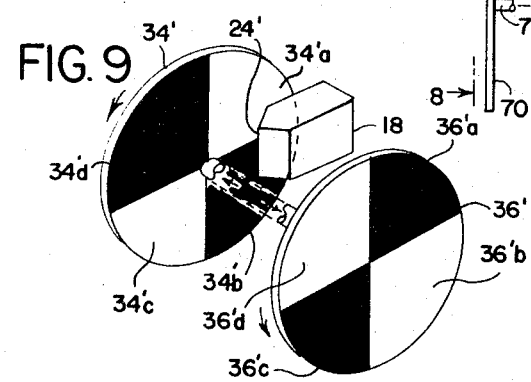
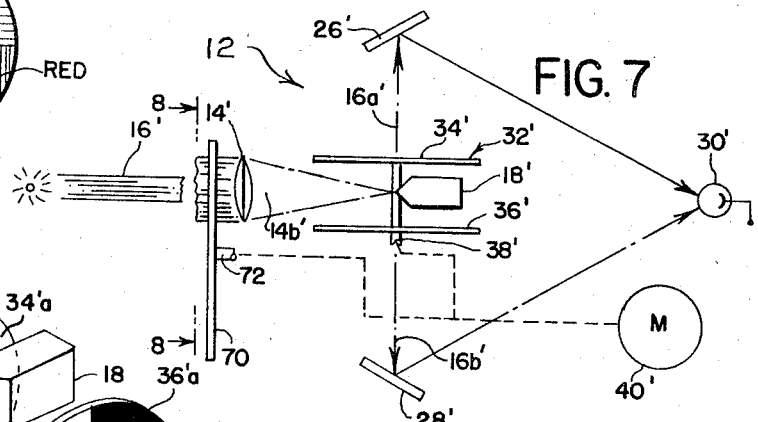
INVENTOR.
DOUGLAS A. KOHL
BY Robert B. Hughes
ATTORNEY

United States Patent Office 3,369,445
Patented Feb. 20, 1968

3,369,445
OPTICAL ALIGNMENT ASCERTAINING DEVICE AND PROCESS FOR ELIMINATION OF REFRACTIVE EFFECTS
Douglas A. Kohl, Osseo, Minn., assignor, by mesne assignments, to Litton Systems, Inc., Beverly Hills, Calif., a corporation of Maryland
Filed Sept. 9, 1963, Ser. No. 307,516
12 Claims. (Cl. 88—14)

This invention relates to the art of ascertaining the true azimuth and elevation of an object by determining the direction of the light emitted therefrom, where the path of such light is subject to refraction such as that which occurs when light passes through the earth's atmosphere.

Most every surveyor has had the experience when sighting through a transit on a somewhat distant object of having the image of the object on which he is sighting waver and "jump," becoming wobbly and indistinct between occassional what seem to be almost instantaneous appearances of a clear image. This is especially noticeable when sighting over a surface such as a roadway on a hot sunny day where the air above the roadway is especially subject to various irregular convection currents and various portions of the air through which the light passes continuously change in temperature and density. This obscuring of the image is caused by the refraction of the light waves traveling from the sighted object to the observer (i.e. the surveyor), and is most troublesome in measuring distant elevations, due to the layered density structure of the lower atmosphere.

This problem is minimal or at least obviated in many cases where the surveyor sights on close targets and establishes longer alignment in increments. However, many situations do not lend themselves to such a solution. For example, when sighting on the pole star (i.e. Polaris), the light from the start to the sighting location must of necessity pass through the earth's atmosphere. Also in geodetic survey work, a survey party will take the practical expedient of sighting from different locations along a base line to various locations such as distant mountain peaks, and determine the locations of these by triangulation.

Accordingly, it is an object of the present invention to provide a process and apparatus to obtain the alignment (azimuth and/or elevation) of an object where the light emitted therefrom is subject to refracting influences such as those encountered by light passing through the earth's atmosphere.

More particularly, this invention accomplishes the aforestated object by continuously sighting on an object whose alignment is to be ascertained, and making a determination of alignment only at such times when the refraction of its light is found to be within a predetermined minimum.

It is a further particular object that these aforestated aims be accomplished simply, reliably, and inexpensively.

These and other objects and features of the invention will be more readily understood and appreciated from the following detailed description of the preferred embodiments thereof selected for purposes of illustration and shown in the accompanying drawings, in which:

FIGURE 1 is a schematic drawing of a first embodiment of the apparatus of the present invention;

FIGURE 2 is a perspective view taken generally from the vantage point indicated at 2—2 in FIGURE 1, in which, for purposes of illustration, the chopper and filter plates are shown spaced from the beam splitter to a greater degree than would normally be desirable;

Each of the figure groups 3A-C through 6A-C illustrate a respective one of four selected operating conditions of the present invention;

FIGURE 7 is a semi-schematic top plan view of a second embodiment of the present invention;

FIGURE 8 is a front elevational view taken from the vantage point indicated at 8—8 and illustrating the arrangement of the filter plates of this second embodiment, and FIGURE 9 is a perspective view similar to figure 2—2 and illustrating the chopper plates of the second embodiment of the present invention.

As indicated in FIGURE 1, numeral 10 designates a light source positioned at the location with respect to which alignment is to be ascertained (e.g. a lamp on a mountain with respect to which a geodetic survey crew is ascertaining alignment). The apparatus of the present invention, generally designated 12, is positioned at the sighting location from which the alignment of the light source 10 is to be ascertained.

This apparatus 12 comprises a focusing means, shown herein simply as a color corrected lens 14, which functions to focus the light rays, indicated at 16, from the source 10 on a focusing area 14a of the apparatus 12. This focusing means 14 (hereinafter referred to simply as the "lens") is so positioned in the apparatus 12 that the optic axis 14b thereof is coincident with the longitudinal axis of the apparatus 12.

At this focus area 14a is positioned a beam splitter 18 which presents two planar reflecting faces 20 and 22 which meet at a vertical edge line or juncture line 24 and make an angle of (as shown herein) 90° with respect to each other. This beam splitter 18 is so positioned that its front edge 24 passes through and is perpendicular to the optic axis 14b of the lens 14 and is at the focal point thereof, with each of its reflecting faces 20 and 22 diverging outwardly and rearwardly from the front edge 24 and each making a 45° angle with the longitudinal axis of the apparatus 12. Thus this front edge 24 functions as an axis of separation in a manner that a beam of light traveling toward the front of the apparatus 12 along the longitudinal axis thereof is split along the axis 24, one segment of this beam being reflected by the face 20 laterally along path 16a to the right generally at a right angle to the longitudinal axis of the apparatus, and the other segment being reflected by the face 22 to the left along path 16b also generally at a right angle to the longitudinal axis.

A pair of mirrors 26 and 28 are positioned one on each side of the beam splitter 18 so as to reflect light directed from a respective beam splitter face 20 or 22 to a single light sensing means, which, as shown herein, is a photo-multiplier tube 30, the function of which will be described more fully hereinafter. Thus it is readily apparent that with the longitudinal axis of the apparatus 12 generally aligned with the light 16 from the source 10, this light 16 will pass through the lens 14 and become focused at the axis of separation 24 of the beam splitter 18, and be separated into two laterally traveling segments 16a and 16b, which are redirected by, respectively, mirrors 26 and 28 to the photo-multiplier tube 30.

The apparatus 12 is provided with an optical chopping device, generally designated 32, which functions to alternately block the segments of light following, respectively, paths 16a and 16b. In the present embodiment, this device 32 comprises a pair of planar circular plates 34 and 36, each having the same even number of equal sectors (six herein designated sequentially in a clockwise direction 34a through f and 36a through f), with the alternate sectors of each plate being opaque. The plane of each plate 34 or 36 is vertically and longitudinallly aligned so that the plates 34 and 36 are parallel to one another, and the center axis of the two plates 34 and 36 are coincident, this coincident center axis being horizontally and transversely aligned and spaced below the focal area 14a of the apparatus 12, and being in the transverse plane containing the axis of separation 24 of the beam splitter 18. Each of the plates 34 and 36 rotate together about their common center axis, this being conveniently accomplished by fixing the plates 34 and 36 to a common drive shaft 38 aligned with said concentric axis of the plates 34 and 36 and driven from a synchronous motor 40.

These plates 34 and 36 are positioned closely adjacent to, and on opposite sides of, the beam splitter 18 so that one plate 34 functions to optically chop the light segment traveling along path 16a while the other plate 36 serves a similar function with respect to the other light segment at 16b. As will be noted from examining FIGURE 2, the opaque sectors, 34a, c and e of plate 34 are spaced alternately with respect to the opaque sectors 36b, d and f of the other plate 36 so that any matching pair of sectors (i.e. 34a–36a, 34b–36b, etc) from the two plates 34 and 36 will comprise one opaque sector and one light transmitting sector. Thus, when light is traveling along one path 16a or 16b, respectively, to the photo-multiplier tube 30, light traveling along the other path 16b or 16a, respectively, will be blocked by its respective plate 36 or 34.

In the present invention, the light 16 emitted from the source 10 has a spectrum of many wave lengths and is thus subject to dispersion by refraction when traversing in a long path through the atmosphere possessing different indexes of refraction for various wave lengths. Thus the light 16 can be said to be made up of various light components differing one from another with respect to the wave lengths thereof, which components are dispersed relative to one another when the light 16 is refracted by the earth's atmosphere. It is to be understood that the term "light" as used herein is intended to refer to electromagnetic radiation within a range of wave lengths (not necessarily within the optical range) so as to be subject to refraction when passing through a medium of variable density such as the earth's atmosphere. However, for convenience (e.g. in initially aligning the apparatus 12 visually), the light 16 emitted from the source 10 contains wave lengths within the visible spectrum.

The light 16 in traveling from the source 10 to the photo-multiplier tube 30 os so filtered that selected components thereof, subject to dispersion by passage through a refracting medium, are permitted to be transmitted to the sensing means 30 in a generally alternating or sequential pattern in timed relationship with the optical chopping of the light segments 16a and 16b, which chopping is, as hereinbefore described, accomplished by the plates 34 and 36. In the present embodiment, this is done simply by having the non-opaque sectors (34b, d, and f and 36a, c and e) of the plates 34 and 36 filter each of the light segments traveling paths 16a and 16b.

The manner in which the plates 34 and 36 accomplish this filtering function is illustrated more clearly in FIGURE 2, wherein the plates 34 and 36, rotating counter-clockwise, are, for purposes of clearer illustration, shown spaced from the beam splitter 18 to a greater degree than would ordinarily be desirable. (Since the chopping of the light 16 will be sharper if done nearer the focal point thereof, and since the focal point of the light 16 is at the axis of separation 24 of the beam splitter 18, it is desirable to have the plates 34 and 36 close to this axis of separation 24.)

The sectors of the plates 34 and 36 which, as shown in FIGURE 2, are just beginning to pass into the light paths 16a and 16b are respectively 34a and 36a. The sectors 34b, 34d and 34f permit the passage of, respectively, green, red and blue light, while the sectors 36a, 36c and 36e also permit the passage of, respectively, green, red and blue light. The character of the light transmitting sectors (i.e. 34b, d and f and 36a, c and e) are such in relation to the intensity of the corresponding (i.e. green, red and blue) components of the light 16 that when a part of the light 16, which part possesses the same relative intensity proportions of green, red and blue as the total light 16, is directed against each of the light transmitting sectors (i.e. 34b, d and f and 36a, c and e), the intensity of light permitted to pass through each of said light transmitting sectors will be equal with regard to the response made in the photomultiplier tube 30.

In explaining the operation of the present invention it should be first indicated that when the light 16 traveling from the source 10 to the apparatus 12 is refracted by the atmosphere, the red component of the light 16 will be refracted by the atmosphere to a lesser extent than the green component, which in turn will be refracted to a lesser extent than the blue component, so that these three light components will actually be arriving at the lens 14 along slightly different directions. The result is that these refracted light portions will be focused on different locations in the focus area 14a of the apparatus 12. On the other hand, when the light 16 is subject to little refraction, the red, green and blue components of light will be traveling along substantially the same path to the lens 14 and will be substantially coincident at the focus area 14a of the apparatus 12.

It is to be understood that the various parts of the apparatus 12 (i.e. focusing means 14, splitter 18, mirrors 26 and 28, chopper 32, etc.) are mounted in a suitable framework or casing in the manner of a precision instrument and would desirably be so enclosed as to exclude light other than that entering through the lens 14 generally along the longitudinal axis of the apparatus 12. The frame on which the apparatus is mounted would itself be mounted in conjunction with angular positioning indicating apparatus, as is done with telescopes, surveyor's instruments, etc. Also, in assembling the parts of the apparatus 12, it may well be desirable to mount these parts so as to permit the making of fine adjustments in the relative position of the parts (as by adjusting screws, etc.). Since these practical expedients of arranging and mounting these parts are well known in the prior art, no attempt has been made herein to indicate the specific manner of accomplishing the same.

In operation, the front of the apparatus 12 is faced toward the light source 10 so that the longitudinal axis of the apparatus 12 is aligned, as closely as possible, with the path of travel of the light rays 16. (This might be done by having an aligning scope fixed to the apparatus 12 so that a fairly accurate visual alignment can be made.) The synchronous motor 40 rotates the plates 34 and 36 at a predetermined speed. On the first sixty degrees of rotation, that segment of the green portion of the light 16 which is reflected from the face 22 of the beam splitter 18 will pass through the plate sector 36a and be reflected by the mirror 28 to the photo-multiplier tube 30. On the second sixty degree increment of rotation of the plates 34 and 36, that increment of the green light component which is reflected from the face 20 of the splitter 18 is permitted to follow path 16a to be reflected by mirror 26 to the tube 30. In the subsequent two-thirds of this cycle of revolution of plates 34 and 36, increments of the red light component and then the blue light component will be transmitted to the tube 30 alternately along paths 16b and 16a.

FIGURES 3A–C through 6A–C illustrate various operating conditions of the apparatus 12. It is believed a clearer understanding thereof will be attained first by examining the operating conditions illustrated in FIGURES 3A–C and then describing the rest of the apparatus 12 before examining FIGURES 4–6. In general, the various parts of the apparatus 12 to be described hereinafter are made responsive to the light impulses or increments received by the tube 30 in a manner that they detect when the red, green and blue light components are bunched at the focus area 14a within predetermined limits (these being moments when refraction by the atmosphere of the light 16 traveling from the source 10 is within a predetermined minimum), and to give a more accurate determination or "vernier reading" of the alignment of the source 10 with respect to the apparatus 12.

FIGURES 3A–C illustrate a situation where the red, green and blue components (designated, respectively, by the letters "R," "G" and "B") are scattered at the focal area 14a to an extent which, it will be assumed, is beyond the desired limit. FIGURE 3A shows the location of these three components "R," "G" and "B" at the focus area 14a with respect to their alignment with the axis of separation 24 of the beam splitter 18. FIGURE 3B illustrates in six sub-figures a–f the location and character of each of six increments of light which are transmitted in sequence to the photo-multiplier tube 30 as each of the six matching pairs of sectors (i.e. 34a–36a, 34b–36b, etc.) come into registration with the light paths 16a and 16b. FIGURE 3C is a graph illustrating the intensity of each of these light increments at the photo-multiplier tube 30 during two revolutions of the plates 34 and 36.

It can be seen that as the plate sectors 34a and 36a are passing through these light paths 16a and 16b that the sector 34a is blocking the light path 16a, while the sector 36a permits the green light reflected from the face 22 of the beam splitter 18 to pass therethrough and reach the photo-multiplier tube 30. In the second sixty degree increment of rotation of the plates 34 and 36, the sector 34b will permit the green light portion reflected from the face 20 of the beam splitter 18 to reach the photo-multiplier tube 30. In like manner, the "c" portion of FIGURE 3B illustrates which increment of light reaches the tube 30 when the pair of sectors 34c and 36c are in registration with the paths 16a and 16b, and the "d," "e" and "f" parts of FIGURE 3B are similar illustrations.

As illustrated in FIGURE 3C, the light intensity for the six parts of a cycle of rotation of the plates 34 and 36 is initially at 80% (at "a") of full intensity, drops (at "b") to 20% stays at 50% for two cycles (at "c" and "d") as the two red increments reach the photo-tube 30, then rises to 100% (at "e") when the full impact of the blue portion is detected by the tube 30, and at the end of the cycle (at "f") drops to zero when the sector 36f blocks the light along 16b and the sector 34f is unable to transmit any light because of the displacement of the blue component to the opposite side of the axis of separation 24.

The photo-multiplier tube 30 functions to produce a current which is proportional to the intensity of the light it receives at any instant. The current from the tube 30 is fed to a capacitor 50 to block any direct current, and a light intensity signal formed by the alternating current passing through the capacitor 50 is amplified at 52 and fed into a proportional phase clamp 54 whose phase reference is derived from the excitation of the synchronous motor 44 so that the phase clamp 54 operates in timed relationship with the chopper and filter plates 34 and 36. As will be explained more fully hereinafter, this alternating current light intensity signal is substantially proportional to the degree which the images of the green, red and blue light components are shifted with respect to the axis of separation 24 of the beam splitter 18.

This phase clamp 54 is so arranged that it transmits the light intensity signal from the amplifier 52 on every other increment or pulse delivered to the tube 30. In the situations shown herein in FIGURES 3A–C through 6A–C, the phase clamp 54 is arranged to pass current pulses of the light intensity signal which may exist during the times when sectors 34b, d and f are passing through the light path 16a. Because the peak to peak amplitude of the light intensity signal is proportional to the difference between successive current pulses from the tube 30, and because the light intensity signal is passed by the phase clamp 54, the magnitude of the outputs from the phase clamp 54 during the "b," "d" and "f" portions of a cycle will be proportional to the difference between the current during each of the "b," "d" and "f" portions of the cycle and, respectively, each of the "a," "c" and "e" portions of the cycle.

The phase clamp 54 provides a first output which is always a positive voltage proportional to the difference between the current during each of the "b," "d" and "f" periods and respectively, each of the "a," "c" and "e" periods. As will be seen more clearly hereinafter, this first output is proportional to the image displacement of each of the red, green and blue light components with respect to the axis of separation 24. Hence if the images of the three light components "G," "R" and "B" are displaced differently with respect to the axis of separation 24, the pulses of this first output will vary in magnitude.

The phase clamp 54 is so arranged that a second output therefrom on each of the "b," "d" and "f" cycle portions will not only vary in magnitude in the manner of the first output, but also is positive or negative depending on whether the intensity of current from the photo-multiplier tube 30 is, respectively, greater or less during each of the "b," "d" and "f" periods than during, respectively, each of the "a," "c" and "e" periods. Thus, as will be disclosed more fully in relating this to the operating situations of FIGURES 3–6, this second output of phase clamp 54 could be both positive and negative during one cycle of revolution of the chopper apparatus 32, if the larger part of each of the blue, red and green light components fall on different sides of the axis of separation 24 of the beam splitter 18.

The first or positive polarity output of the phase clamp 54 goes to a peak indicator 56 which produces a direct current proportional to whichever of the pulses in the pulse train is of the greatest intensity, this current being fed directly to a difference amplifier 58. The same first output of the phase clamp 54 also goes directly to the difference amplifier 58, the instantaneous values of this output being proportional to the instantaneous displacement of the green, red and blue images in time sequence with respect to the axis of separation 24. The difference amplifier 58 compares the steady output of the peak indicator 56 with the pulses received directly from the phase clamp 54 and produces a current proportional to the difference in the output of the peak indicator 56 and the output it receives from the phase clamp 54. The output of the difference amplifier 58 passes through a rectifier 60 and operates a gate 62 in a manner that when the current from the rectifier 60 is below a predetermined level, the gate 62 will open.

The second output from the phase clamp 54 passes through a low pass filter 64 to the gate 62. The low pass filter output is proportional to the average of the pulses of this second output and is thus proportional to the displacement or deviation of the images of the red, green and blue components with respect to the axis of separation 24. When the gate 62 is opened, direct current from the low pass filter 64 passes through gate 62 to a recording digital voltmeter 66 which makes a record of the various voltage signals it receives.

Thus it becomes apparent that there are two main facets to the operation of the components 50–66. The first is to compare the intensity of every other increment of light reaching the photo-multiplier tube 30 so as to ascertain the moments when the red, green and blue components are bunched to a predetermined degree at the focus area. This is determined by ascertaining when the intensity of light reaching one of the two faces 20 and 22 of the beam splitter 18 is substantially the same for all three light components. When every alternate light increment (i.e. those reflected from one face, either 20 or 22) are substantially equal, the gate mechanism 62 is operated so that a reading can be taken to compare the intensity of light received from one of the faces 20 as compared to the other face 22 of the beam splitter 18 (this being the second facet of the operation). This comparison indicates to what extent the light components are concentrated on one side or the other of the axis of separation 24 of the splitter 18 and hence gives the degree and direction of misalignment of the light path 16 with respect to the focal axis 14b of the lens 14, which focal axis passes through the axis of separation 24.

Thus, in the condition illustrated in FIGURES 3A–C, the difference between the steady current from the peak indicator 56 and the pulse current from the phase clamp 54 to the difference amplifier 58 is large enough so that the current from the difference amplifier 58 to the rectifier 60 and to the gate 62 will close the gate 62 and prevent any transmission from the phase clamp 54 to the voltmeter 66.

FIGURES 4A–C illustrate a second operating condition where the apparatus 12 is somewhat misaligned from the true alignment to the source 10, but the light 16 at this time is refracted to a very small degree and hence the green, red and blue portions of the light 16 fall on substantially the same place at the focal area 14a of the apparatus 12. As seen in FIGURE 4A, only the extreme left parts of the light portions "G," "R" and "B" are reflected from the face 20 of the splitter 18. FIGURE 4B illustrates the sequence in which the various light increments are transmitted to the photo-multiplier tube 30, while FIGURE 4C is a graph showing the intensity of these light increments.

Thus it can be seen that an alternating current of relatively great amplitude is transmitted through the capacitor 50 and amplifier 52 to the phase clamp 54. However, the output of the peak indicator 56 (which is proportional to the peak of the current during the "b," "d" and "f" portions of the cycle) will be nearly the same as each of the three green, red and blue pulses of the direct output of the clamp 54 to the difference amplifier 58. Thus the output of the difference amplifier 58 to the rectifier 60 will be pulses of small magnitude which will permit the gate 62 to open. This permits the phase clamp 54 to transmit its second output (i.e. a voltage proportional to the average relative intensity of the current at the "b," "d" and "f" periods as related to the "a," "c" and "e" periods) to the voltmeter 66. The magnitude of the voltage registered on the voltmeter 66, indicates the distance the center line of the light portions "G," "R" and "B" are displaced from the axis of separation 24, and thus indicates the amount of angular misalignment between the longitudinal axis of the apparatus 12 and the apparent true direction line to the source 10. The polarity of the voltage registered on voltmeter 66 indicates the algebraic sign of the misalignment error.

FIGURE 5 shows the circumstance where the apparatus 12 is quite closely aligned with the alignment of the source 10, and the bunched light portions "G," "R" and "B" are all fairly well centered, with respect to the axis of separation 24, during a period of very little refraction. In such a circumstance, as can be seen from the graph 5C, the difference between the "b," "d" and "f" portions of the current from the tube 30 and the "a," "c" and "e" portions thereof is sufficiently small to open the gate 62, while the amplitude of the total current will be small so that the voltage read by the voltmeter 66 will also be low. This voltage in turn indicates a small degree of misalignment between the focal axis 14b of the lens 14 (which is also the longitudinal axis of the apparatus 12) and the alignment to the source 10.

FIGURES 6A–C are arranged in the same pattern as FIGURES 3A–C through 5A–C and indicate a situation where the light portions "G," "R" and "B" are closely bunched but fall mostly to the left of the axis of separation 24. In such a case, the current peaks at "b," "d" and "f" are sufficiently close to each other so that the gate 62 will open, and because of the relatively great amplitude of the current, as indicated in FIGURE 6C, the DC voltage fed to the voltmeter 66 will be relatively large. However, since the current pulses during the "b," "d" and "f" portions of the cycle are oppositely disposed as compared to the corresponding current portions in the circumstance indicated in FIGURE 4C, the DC voltage will be opposite in sign to the voltage indicated in the circumstance illustrated in FIGURE 4. Thus it can be seen that not only does the voltmeter 66 record the degree of misalignment between the apparatus 12 and the alignment to the source 10, but also the direction of such misalignment.

By adjusting the gate 62 so as to modify the sensitivity thereof, greater or lesser accuracy can be obtained. During an operation, it would be expected that during the greater portion of the total time that the apparatus 12 is directed to the light source 10, the refraction of the light rays 16 in passing through the atmosphere would be too great to permit a reading to be taken. However, during those brief moments when the refraction is within a predetermined minimum, a reading will be transmitted to the voltmeter 66. By taking a plurality of these readings and averaging the same, the alignment (with respect to azimuth, as shown herein) to the source 10 can be rather closely ascertained.

A second embodiment of the present invention is illustrated in FIGURES 7 through 9. Components of this second embodiment which serve quite similar functions to like components of the first embodiment will be given corresponding numerical designations, with a prime (′) designation distinguishing those of the second embodiment. Thus it can be seen that the apparatus 12′ of this second embodiment comprises a lens 14′, a beam splitter 18′ and an optical chopping means 32′. This latter comprises two plates 34′ and 36′ driven through a shaft 38′ from a synchronous motor 40′. However, in the present embodiment the plates 34′ and 36′ have the sectors thereof 34a′–d′ and 36a′–d′ formed as quadrants of a circle so that on every rotation of the plates 34′ and 36′ four light increments each the photo-multiplier tube 30′. Also, the non-opaque sectors 34a′, 34c′, 36b′ and 36d′ are made completely transparent, while the filtering function of the light rays 16 is performed by a separate plate 70.

One semi-circle of this plate 70 transmits red light, while the other transmits blue light. To turn the plate 70 in phase with the rotation of the plates 34′ and 36′, the shaft 72 from plate 70 is driven, as is the shaft 38′, by the synchronous motor 40′. The axis of rotation of the plate 70 is parallel to, and spaced from, the focal axis 14b′ of the lens 14′ so that the outer or peripheral portion of the plate 70 passes through the path of the light rays 16′. The plate 70 is so arranged with respect to the plates 34′ and 36′ that as the pairs of matching sectors 34a′–36a′ and 34b′–36b′ pass through the light paths 16a and b, the plate 70 permits only blue light to pass to the beam splitter 18′, while on the other half of the cycle when sectors 34c′–36c′ and 34d′–36d′ are passing through paths 16a′ and 16b′, only red light is transmitted to the beam splitter 18′.

The nature and operation of the electrical apparatus of the second embodiment is substantially the same as that of the first embodiment (which, in the first embodiment, comprises components 50–66), and hence is not shown in FIGURES 7–9, it being understood that components as shown at 50–66 in FIGURE 1 are similarly operatively connected to the tube 30′ in this second embodiment. However, the phase clamp in this second embodiment is so arranged that it will transmit on alternate quarter periods of the rotation of the plates 34′ and 36′, instead of alternate one sixth periods as in the first embodiment.

In operation, the plate 70 and the plates 34′ and 36′ are rotated at the same speed and in phase. On the first half cycle of rotation, the blue light component passing through the plate 70 will fall on the beam splitter 18′ and (with the alignment of the apparatus 12′ being reasonably close to the alignment to the source 10′) will be split in some proportion into two paths 16a′ and 16b′. The sector 34a′ will permit part of the blue light component to follow path 16a′ to the photo-tube 30′, while on the next quarter cycle the sector 36b′ will permit the other part of the blue component to reach the photo-tube 30'. During the next half cycle, two parts of the red light component will reach the photo-tube 30', one on path 16a' and the other on path 16b'. The rest of the apparatus, illustrated previously at 50–66, functions substantially the same as in the previous embodiment. That is, it first determines when alternate pulses of current are nearly the same level, and during such periods produces a DC voltage proportional to the amplitude of the AC current from the tube 30' to determine the degree and direction of misalignment of the light path 16' with respect to the focal axis 14b' of the lens 14'.

Now therefore I claim:

1. The process of determining the amount of misalignment between a focal axis of a sighting device and a light axis extending from said device to a source which transmits light toward said sighting device, which light is comprised of different wavelength components, and wherein said components, in traveling from said source to said sighting device, are subject to varying amounts of refraction, said process being effective to determine said amount of misalignment only when said refraction is within predetermined limits, which process comprises:

focusing said light along said focal axis toward a reference line so that when said axes are misaligned, said images are generally focused on one side of said line, said focusing of light refracted in traveling from said source being effective to focus spaced images of said different wavelength components on opposite sides of said line, said focusing of light substantially unrefracted in traveling from said source being effective to focus bunched images on opposite sides of said line;

splitting said different wavelength components into segments according to which side of said reference line each of said images is focused and causing each of said segments to travel along a respective one of two paths of travel;

filtering said different wavelength components in a generally alternating pattern so that selected components are permitted to travel to said sensing means in a generally sequential cycle;

optically chopping each segment in timed relationship with said filtering to alternately prevent one segment from traveling along its respective path while the other segment travels along its respective path so that a series of light increments is transmitted in a pattern, said series including successive light increments of a first different wavelength component which traveled said two paths followed by successive increments of a second different wavelength component which traveled said two paths;

determining a first difference in intensity between the successive light increments of the first component;

determining a second difference in the intensity between the successive light increments of the second component;

determining the maximum of said first and second differences;

comparing said maximum to said first and second differences for generating a first signal when said refraction of said first and second components exceeds said predetermined limits and generating a second signal when said refraction of said first and second components is within said predetermined limits; and indicating in response to said second signal the intensity of all said light increments which traveled said first path relative to the intensity of all said light increments which traveled said second path to determine the extent by which said focal axis is out of alignment with said light axis.

2. The process as recited in claim 1, wherein said light is filtered as it is traveling along said paths.

3. The process as recited in claim 2, wherein said chopping and filtering of each path is accomplished by alternately passing opaque and filter plate means across each path.

4. The process as recited in claim 1, wherein said light is filtered before said focusing.

5. Apparatus for determining the extent of misalignment between an axis of a sighting instrument and a line of sight from said instrument to a source of light, wherein light from said source is refracted to produce different wavelength components, which apparatus comprises:

beam splitting means having an axis of symmetry for separating light incident thereon into first and second paths, said beam splitting means being effective to split each of said different wavelength components according to the location of incidence thereof relative to said axis;

means for detecting for each said different wavelength component of said components the difference in the intensity of said component in said first path from that of said component in said second path to produce a difference output for each of said different wavelength components;

means for comparing the maximum one of said difference outputs with each of said difference outputs;

means for generating a signal indicative of the relative magnitude of said maximum ones of said difference outputs and said difference outputs; and means rendered effective when said signal reaches a predetermined level for determining the difference between the intensity of said different wavelength components in said first path and that of said different wavelength components in said second path to indicate the extent of said misalignment.

6. Apparatus for eliminating the effects of refraction in the alignment of an axis of a sighting device with a line extending from a source of light to said device, said refraction being effective to produce light components of different wavelengths, which comprises:

beam splitting means having an axis of symmetry for separating light incident thereon into first and second paths, said beam splitting means being effective to split each of said different wavelength components according to the location of incidence of said different wavelength components relative to said axis of symmetry;

means for filtering said different wavelength components, said filtering means transmitting the same selected different wavelength components in each path at the same time and different selected components in succession;

chopping means interposed in each of said first and second paths for transmitting in succession a portion of said selected different wavelength component in said first path and a portion of said selected different wavelength component in said second path;

means responsive to the successively transmitted different wavelength components for generating a light signal having a peak-to-peak amplitude corresponding to the location of incidence of each of said different wavelength components relative to said axis of symmetry;

phase clamp means synchronized with said chopping means and responsive to said light signal for producing a first output signal including a pulse having an amplitude indicative of the amount of displacement of each of said different wavelength components from said axis of symmetry;

first means for comparing the amplitudes of said pulses to the amplitude of the maximum one of said pulses to produce a control signal indicative of the amount of refraction of said light;

second means for comparing the intensity of all the different wavelength components of said light in said second path to that in said first path to indicate the degree of said alignment; and means responsive to said control signal of a predetermined magnitude for rendering said second comparing means ineffective to indicate said degree of said alignment.

7. The process of determining, with minimum error caused by refraction, the amount of misalignment between an axis of sight extending from a sighting location to a source which transmits light toward said sighting location and a focal axis at said sighting location, said light including different wavelength components, said components in traveling from said source to said sighting point being subject to varying amounts of refraction, said method comprising the steps of:

focusing said light generally along said focal axis toward a focus area which is intersected by a reference line extending through said focal axis, said reference line dividing said focus area into first and second areas, said light which is refracted in traveling from said source being focused in the form of an image for each of said different wavelength components, each said image being focused on said first and second areas according to the amount of said refraction, said light which is substantially unrefracted in traveling from said source being focused on said focus area in substantially a single image, the location of said substantially single image relative to said reference line being indicative of the alignment of said axis of sight and said focal axis;

measuring the intensity of that portion of the image of each of said different wavelength components which is focused in said first area;

measuring the intensity of that portion of the image of each of said different wavelength components which is focused in said second area;

producing an output signal in accordance with the differences between said intensities of the portion of each of said images in said first area and the portion of the images of the corresponding different wavelength component in said second area for indicating a predetermined amount of refraction of said light; and indicating in response to said output signal the difference between the intensities of said images of said different wavelength components focused on said first area and the intensities of said images of said different wavelength components focused on said second area to determine said amount of said misalignment.

8. Apparatus according to claim 5 which further includes:

means for filtering said split different wavelength components in said first and second paths, said filtering means transmitting in succession selected ones of said components; and chopping means interposed in each of said first and second paths for chopping said transmitted components, said chopping means being effective for each selected component to alternately block transmission of said selected component in said first path while permitting transmission of said selected component in said second path and then block said selected component in said second path while permitting transmission of said selected component in said first path;

said filtering and chopping means being effective to produce a series of light pulses for detection by said detecting means, said series of pulses including in succession at least a first component from said first path, said first component from said second path, a second component from said first path and said second component from said second path.

9. Apparatus according to claim 6 which further includes:

means responsive to said control signal of less than said predetermined magnitude for rendering said second comparing means effective to indicate said degree of said alignment.

10. Apparatus for eliminating the effects of refraction in the alignment of an axis of a sighting device with a line extending from a source of light to said device, said refraction being effective to produce light components of different wavelengths, which comprises:

beam splitting means having an axis of symmetry for separating light incident thereon into first and second paths, said beam splitting means being effective to split each of said different wavelength components according to the location of incidence of said different wavelength components relative to said axis of symmetry;

means for filtering said components, said filtering means transmitting at any one time the same components in the first and second paths and transmitting in succession different ones of said components;

chopping means interposed in each of said first and second paths for transmitting said same components alternately in said first and second paths;

means including a photocell and a capacitor responsive to said alternately transmitted different components for generating a light signal, said light signal having a peak to peak amplitude for each different component, said amplitude corresponding to the location of incidence of said same components relative to said axis of symmetry;

phase clamp means operated in synchronism with said filtering means and said chopping means, said phase clamp means being effective to transmit alternate pulses of said light signal to produce a first output signal having peaks indicative of the absolute difference between the intensity of successive pairs of each of said same components in said first and second paths, said phase clamp also being effective to transmit alternate pulses of said light signal to produce a second output signal having peaks indicative of both the side of said axis of symmetry which received the most intense light from a given component and the difference in the intensity of light received by opposite sides of said axis of symmetry;

means for producing a first comparison signal proportional to the maximum peak in said first output signal;

means for comparing said first output signal to said first comparison signal to generate a control signal; and gate means for passing said second output signal in response to said control signal having a magnitude below a predetermined level, said gate means being effective to block said second output signal in response to said control signal having a magnitude above said predetermined level.

11. The process of eliminating the effects of refraction in the alignment of an axis of a sighting device with a line extending from a source of light to said device, said refraction being effective to produce light components of different wave lengths, which comprises the steps of:

splitting said light into first and second paths relative to an axis of symmetry so that each of said components is split according to the location of each of said components relative to said axis of symmetry;

filtering said split components in said first and second paths to successively transmit selected ones of said components, said filtering being effective to transmit in each path at any given time a given selected component;

chopping said selected components in said paths to successively and alternately block said given selected component in said first path while passing said given selected component in said second path and then passing said given selected component in said first path while blocking said given selected component in said second path;

generating a light signal having a peak to peak amplitude for each of said selected components, each said amplitude corresponding to the location of incidence of each said selected componet relative to said axis of symmetry;

producing in synchronism with said chopping and in response to said light signal an output signal including pulses having amplitudes indicative of the amount of displacement of each of said components from said axis of symmetry;

comparing the amplitudes of said pulses to the amplitude of the maximum one of said pulses;

producing, in accordance with the relative magnitudes of the maximum one of said pulses and said pulses, a comparison control signal indicative of the amount of relative displacement between said components;

producing, in accordance with the relative intensity of light in said second path and that in said first path, an indicating signal representative of the degree of said alignment; and when said control signal is of a predetermined magnitude using said indicating signal to indicate the degree of said alignment.

12. The process of eliminating the effect of refraction in the alignment of a reference line of a sighting device with a line of sight extending from a source of light to said sighting device, which comprises the steps of:

pointing said sighting device generally toward said line of sight to permit light from said source to impinge upon said reference line, refraction of said light being effective to produce spaced, different wavelength light components, said light which is unrefracted having said different wavelength components bunched so that said spacing is less than a given amount;

measuring the amount of said spacing of said different wavelength components; and when said measured amount of spacing is less than said given amount of said spacing measuring the distance between said bunched components and said reference line to indicate the alignment of said sighting device with said line of sight.

References Cited
UNITED STATES PATENTS 3,103,586   9/1963   Ovrebo et al. _____ 250—83.3

OTHER REFERENCES

Whitford, A. E., Kron, G. E.: Photoelectric Guiding of Astronomical Telescopes, Review of Scientific Instruments, vol. 8, March 1939, pp. 78–79.

JEWELL H. PEDERSEN, *Primary Examiner.*

A. A. KASHINSKI, *Assistant Examiner.*